US012349243B2

(12) United States Patent
Desmeules et al.

(10) Patent No.: US 12,349,243 B2
(45) Date of Patent: Jul. 1, 2025

(54) CONTROL DEVICE FOR MOUNTING ON ELECTRICALLY HEATED ARTICLES OF APPAREL

(71) Applicant: Alain Desmeules, Montreal (CA)

(72) Inventors: Alain Desmeules, Montreal (CA); Julie Kassabian, Montreal (CA)

(73) Assignee: Brooke Erin DeSantis, Montreal (CA)

( * ) Notice: Subject to any disclaimer, the term of this patent is extended or adjusted under 35 U.S.C. 154(b) by 833 days.

(21) Appl. No.: 17/581,891

(22) Filed: Jan. 22, 2022

(65) Prior Publication Data

US 2023/0239972 A1 Jul. 27, 2023

(51) Int. Cl.

| | |
|---|---|
| ***H05B 3/42*** | (2006.01) |
| ***A41D 1/00*** | (2018.01) |
| ***A41D 13/005*** | (2006.01) |
| ***H05B 3/00*** | (2006.01) |
| ***H05B 3/04*** | (2006.01) |
| ***H05B 3/34*** | (2006.01) |

(52) U.S. Cl.

CPC ............. *H05B 3/342* (2013.01); *A41D 1/005* (2013.01); *A41D 13/0051* (2013.01); *H05B 3/0019* (2013.01); *H05B 3/04* (2013.01); *A41D 2400/12* (2013.01); *H05B 2203/036* (2013.01)

(58) Field of Classification Search

CPC .... A41D 1/002; A41D 1/005; A41D 13/0051; A41D 2400/12; H05B 1/0272; H05B 2203/036; H05B 3/0019; H05B 3/04; H05B 3/06; H05B 3/342

USPC .......................................................... 219/211

See application file for complete search history.

(56) References Cited

U.S. PATENT DOCUMENTS

| | | | |
|---|---|---|---|
| 3,786,391 | A | 1/1974 | Mathauser |
| 4,390,232 | A | 1/1983 | Jamgotchian |
| 5,779,487 | A | 7/1998 | Gatin |
| 7,741,806 | B2 | 6/2010 | Kuhlmann et al. |
| 8,626,297 | B2 | 1/2014 | Jaax et al. |
| 9,531,118 | B2 | 1/2016 | Byrne et al. |
| 11,050,274 | B2 | 6/2021 | Yang |

(Continued)

*Primary Examiner* — Sang Y Paik

(74) *Attorney, Agent, or Firm* — Guy J. Houle; Houle Patent Agency Inc.

(57) ABSTRACT

An integrated control device for mounting in electrically heated articles of apparel for controlling power to heating wires secured in the articles of apparel. The control device has a finger-operable switch integrated with electronic circuits mounted on a pcb board. The electronic circuits have a communication circuit to interface with a user person to provide message information to the user person. A waterproof envelope shields at least a portion of the control device. An input electrical connecting port is mounted on the control device and accessible from outside the waterproof envelope. The input electrical connecting port is configured to magnetically receive and retain an external electrical connector having a conductor cable secured thereto to provide power to the electronic circuits from an external electrical power source. The input electrical connecting port, and the external electrical connector positioned therein, exhibit a magnetic coupling force of a predetermined strength permitting rotational planar displacement of the external electrical connector, when a shear force is applied thereto by the conductor cable of the external electrical connector, without separating the magnetic coupling retention force between the magnet retainers.

19 Claims, 5 Drawing Sheets

(56) References Cited

U.S. PATENT DOCUMENTS

| | | | | |
|---|---|---|---|---|
| 2008/0271220 | A1* | 11/2008 | Chilton | A41D 1/002<br>2/69 |
| 2013/0334194 | A1 | 12/2013 | Chen | |
| 2014/0166631 | A1* | 6/2014 | Rozmarynowski | B23K 10/00<br>219/121.48 |
| 2015/0230524 | A1* | 8/2015 | Stevens | H05B 1/02<br>219/494 |
| 2016/0172655 | A1* | 6/2016 | Rigobert | H01M 50/566<br>219/76.1 |
| 2017/0338676 | A1 | 11/2017 | Yan | |
| 2018/0212359 | A1* | 7/2018 | Wei | H05K 1/181 |
| 2019/0135372 | A1* | 5/2019 | Knitt | H05B 1/0236 |
| 2020/0163162 | A1* | 5/2020 | Lightsey | H05B 1/0272 |
| 2022/0320796 | A1* | 10/2022 | Zhang | H01R 13/6277 |

* cited by examiner

CONTROL DEVICE FOR MOUNTING ON ELECTRICALLY HEATED ARTICLES OF APPAREL

FIELD OF THE INVENTION

The present invention relates to electrically heated articles of apparel and more specifically to an improved control device for mounting into such articles.

BACKGROUND OF THE INVENTION

Control devices mounted on heated articles of apparel are known in the art whereby to provide a user person an external means to control the supply of current to the heating wires or heating pads secured in patterns in the article of apparel to thereby control the temperature of the heat generated by the heating wires. These control devices have several wires connected to a circuit board provided with electronic components as well as a switch to control the intensity of the current supplied to the heating wires. Such control devices are also mounted at a convenient location on the outer surface of the article of apparel for visual and easy access to the control switch by the user person.

Associated with such control devices is a battery or battery pack to provide power to the heating wires through the control device. These batteries are usually concealed in pouches formed in the article of apparel to provide ease of access when the batteries need to be recharged or replaced by another batteries. Also, these batteries need to be disconnected when they require charging. This is very inconvenient to the user person, particularly in a cold climate environment and for such reason it is necessary for the user person to carry spare batteries, thus creating another inconvenience. Many such control devices are usually provided with a light which is made visible to the user person to indicate that the batteries are charged or the remaining charge or entirely depleted of their charge and require charging or replacement with charged batteries. Accordingly, the mounting position of the control device needs to provide visual access to the user person. The electronic control circuits of these devices are also require operating voltage from the battery or batteries. When the battery or batteries are permanently connected to the control circuit and need to be charged, the charging voltage is provided through a charging port secured to a supply cable having wires connected to the control circuit through a switch with the charging port made accessible at a convenient location accessible to the user person to permit insertion of a plug-in connector from a supply source to charge the battery or batteries. Tension on the supply cable caused by movements of the user person can also damage the supply cable and its wiring. It is also important to secure these control devices and their batteries at locations which provide protection against bad weather conditions, such as rain or snow.

Still further, these control devices need to be secured at a visible and accessible location on the article of apparel of supported in a pocket requiring the user person to retrieve the control device and the supply wire connected thereto. This manipulation is inconvenient to the wearer person and can cause damage to the wiring. Further, the installation of such control devices and its associated wiring and charging cable in an article of apparel requires extra care by the fabricator of such articles with precise attachment of the wiring from the control circuits to the heating wires, to prevent the risk of the wiring becoming detached during use. Still further, these control devices often require that the article of apparel can only be dry cleaned and during such dry-cleaning process damage may be caused to its wiring. Because these known control devices and their associated remote charging port and wiring form a bulky package, their application is somewhat limited to the type of article of apparel that can be equipped with such, and usually limited to installation on jackets, vests, or other convenient body garments. Their assembly is often not aesthetically pleasing to the eye.

Electrically heated gloves, for example, requires the fabrication of a small pocket on the glove in which a small thin battery is contained and a connector to the battery supply. The pocket is usually closed by a zipper type closure to seal the pocket to protect the battery against water infiltration. Once the battery is depleted of its charge, the user person needs to open the pocket, retrieve the battery from the pocket, which is usually small providing difficult access, and disconnect the battery form its connection. The battery then requires to be connected to a charging supply. This process is then reversed to re-install the battery in its pocket. Such process requires frequent manipulation of the battery which will eventually cause wear and damage and often loss due to its frequent removal from the glove. For the battery to resist to such frequent manipulation it is required to have a battery which is more robust and accordingly larger and heavier and which is heavier in the wrist portion of the wearer person making it very uncomfortable. However, the frequent manipulation of the battery eventually causes premature wear and breakage of the zipper closure. Still further, the user person often forgets to charge the battery making the heated feature non-functional and eventually stops using the heating feature or the gloves, entirely.

It would be advantageous to provide a control device capable of overcoming the above mentioned problems of know prior art heated articles and to provide additional desirable features.

SUMMARY OF THE INVENTION

It is a feature of the present invention to provide an integrated control device for electrically heated articles of apparel and which overcomes the above-mentioned problems of the prior art control devices and which provides additional features and benefits to the user person and to the fabricator of such heated articles of apparel.

It is another feature of the present invention to provide an integrated control device for electrically heated articles of apparel and which is fully integrated in a waterproof envelope structure, including a connecting port, and which only has an output cable containing supply wires to one or more heating wires installed in the article of apparel thereby greatly reducing the risk of wire breakage and facilitating its assembly in an article of apparel while providing a pleasing aesthetic look.

Another feature of the present invention is to provide an integrated control device for electrically heated articles of apparel and which has an integrated connecting port provided with a magnetic retainer for magnetic retention of an external connector and constructed such as to permit rotational planar displacement of the external connector when tension is applied to the supply wire, without being disconnected and further wherein it is not required to remove the battery from its storage pocket to be charged for the reason that it can be charged through the input connecting port. Additionally, the connecting port can serve for the connection of an external battery supply to supplement the battery or batteries stored in the article of apparel.

A further feature of the present invention is to provide an integrated control device equipped with an input connecting port formed as a cylindrical housing provided with a magnetic retainer and configured for close retention fit of an external electrical connector also having a magnetic retainer and wherein said external electrical connector is easily plugged and unplugged from the cylindrical housing.

Another feature of the present invention is to provide an integrated control device for electrically heated articles of apparel and which can be secured on an inner liner of an article of apparel and providing a wearer person the possibility of operating the switch of the control device hidden behind an outer shell fabric material concealing the entire control device while permitting its operation.

A further feature of the present invention is to provide an integrated control device for electrically heated articles of apparel and which is fully integrated and compact as well as being waterproof and because of its small size can be adapted to several types of articles of apparel, such as socks, gloves, base liners or other articles of apparel requiring heating.

A still further feature of the present invention is to provide an integrated control device which overcomes the mentioned problems of the prior art heated gloves.

Another feature of the present invention is to provide an integrated control device for electrically heated articles of apparel and which is easy to integrate into the article of apparel during its fabrication and requiring little quality control due to the integrated design of its controller and the waterproof aspect thereof.

A further feature of the present invention is to provide a control device for electrically heated articles of apparel and which is capable of providing communication information to a wearer person from said control device either visual or by impulse signals.

Another feature of the present invention is to provide an integrated control device for heated articles of apparel and wherein the control device is provided with LED lamps which are operated by the electronic circuit of a pcb board to provide visual signals to a user person of the charging process, the power currently in the battery or battery pack associated therewith and the temperature setting by the user person.

A still other feature of the present invention is to provide an integrated control device for electrically heated articles of apparel and wherein the control device is mounted in a concealed area of the article of apparel and communication to the user person is provided by non-visible means such as a haptic hammer device connected to the pcb to communicate the function settings or information to the user person.

Another feature of the present invention is to provide an integrated control device for electrically heated articles of apparel and wherein the electronic circuitry can be formatted to provide wireless connectivity thereto, such as Bluetooth or other, to permit wireless operation.

A still further feature of the present invention is to provide an integrated control device for electrically heated articles of apparel and which is constructed such as to be secured to such articles of apparel by means of stitch seams or glue and with only a single cable exiting the control device to provide operating voltage to one of more heating wire patterns secured in the article of apparel.

According to the above features, from a broad aspect, the present invention provides an integrated control device for mounting in electrically heated articles of apparel for controlling power to heating wires secured in the articles of apparel. The control device has a finger-operable switch integrated with electronic circuits mounted on a pcb board. The electronic circuits have a communication circuit to interface with a user person to provide message information to the user person. A waterproof envelope shields at least a portion of the control device. An input electrical connecting port is mounted on the control device and accessible from outside the waterproof envelope. The input electrical connecting port is configured to magnetically receive and retain an external electrical connector having a conductor cable secured thereto to provide power to the electronic circuits from an external electrical power source. The input electrical connecting port, and the external electrical connector positioned therein, exhibit a magnetic coupling force of a predetermined strength permitting rotational planar displacement of the external electrical connector, when a shear force is applied thereto by the conductor cable of the external electrical connector, without separating the magnetic coupling retention force between the magnet retainers.

BRIEF DESCRIPTION OF THE DRAWING

A preferred embodiment of the present invention will now be described with reference to the accompanying drawings in which:

FIG. 6 is a perspective view of a vest type article of apparel showing the control device of the present invention concealed behind the outer fabric shell of a vest and wherein the switch is actuated by a wearer person by feeling the position of the elevated push-button switch;

DESCRIPTION OF THE PREFERRED EMBODIMENT

Before any embodiments of the application are explained in detail, it is to be understood that the application is not limited to the details of construction and the arrangement of component part set forth in the following description or illustrated by the following drawings. Further, it is to be understood that the phraseology and terminology used herein is for the purpose of description and should not be regarded as limiting but should encompass equivalents thereof.

Figure 1:
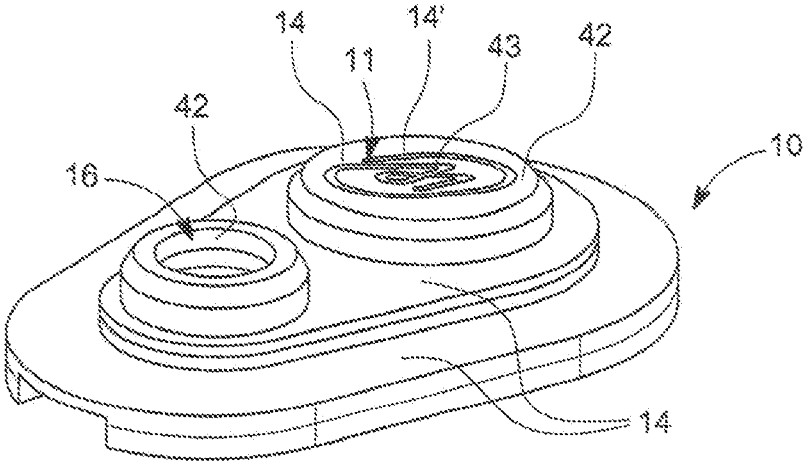
FIG. 1 is a perspective view of the integrated control device of the present invention and showing the external magnetic electrical connector adapted for connection with a magnetic electrical input connecting port of the control device and an enlarged view of the input connecting port.
Figure 2A:
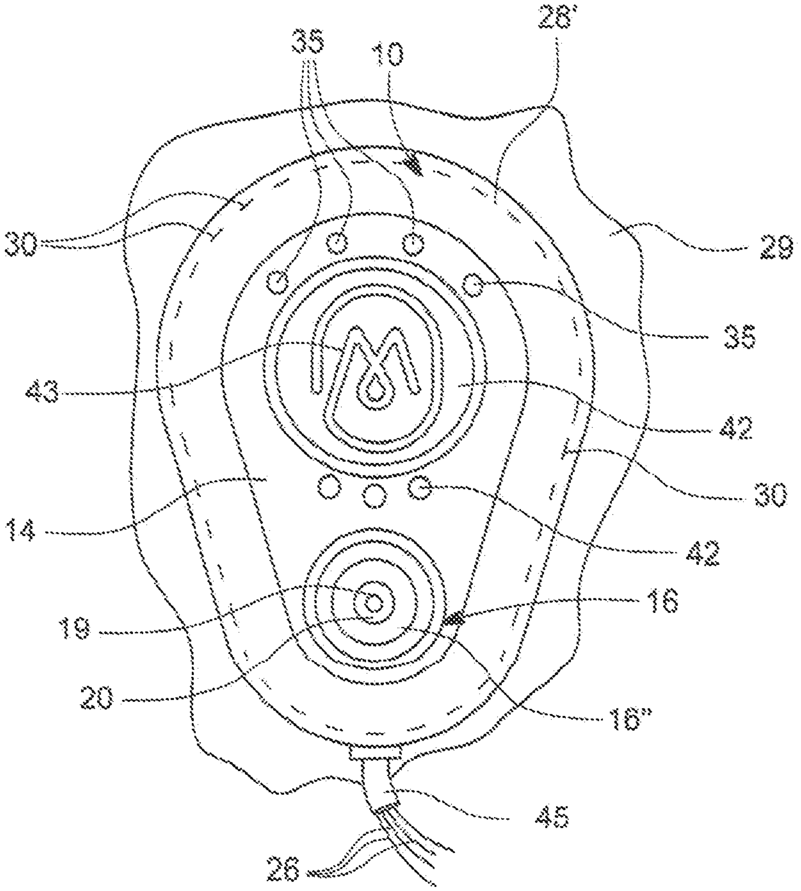
FIG. 2A is a top view of the integrated control device of FIG. 1 and showing the inside female connector of the input connecting port and wherein a single output cable containing the power feeding wires to provide operating voltage to the heating wires permanently secured in an article of apparel.
Figure 2B:
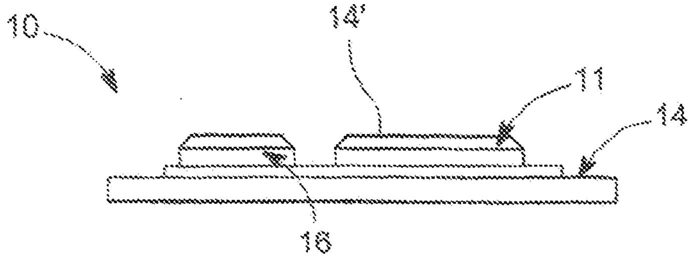
FIG. 2B is a side view of FIG. 2A
Figure 3:
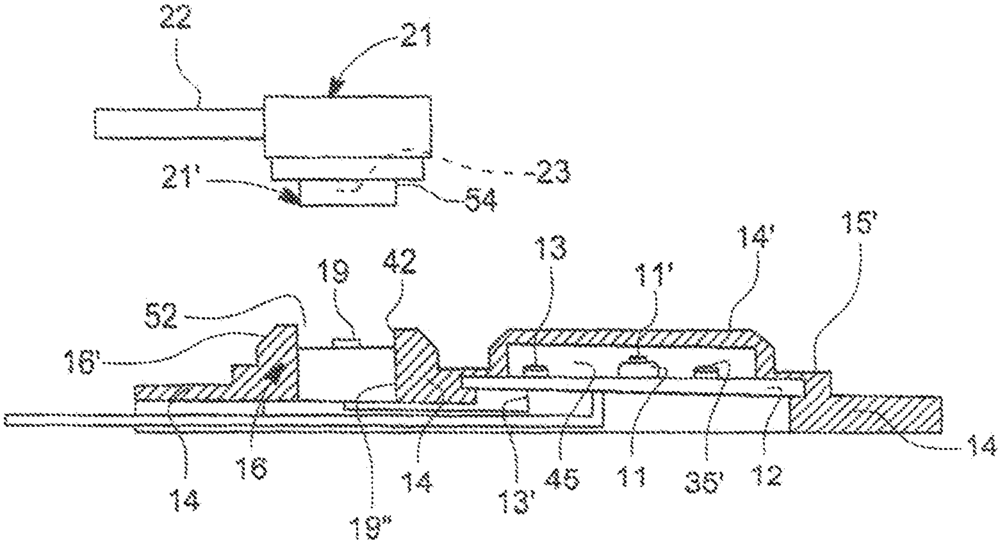
FIG. 3 is a side sectional view of the integrated control device showing the external male magnetic electrical connector above the female connector for magnetic engagement within a cylindrical connecting housing and the elevated push-button switch membrane disposed over the top surface of the push-button switch connected to the pcb there under which is sealed and waterproofed by a silicon material.
Figure 8:
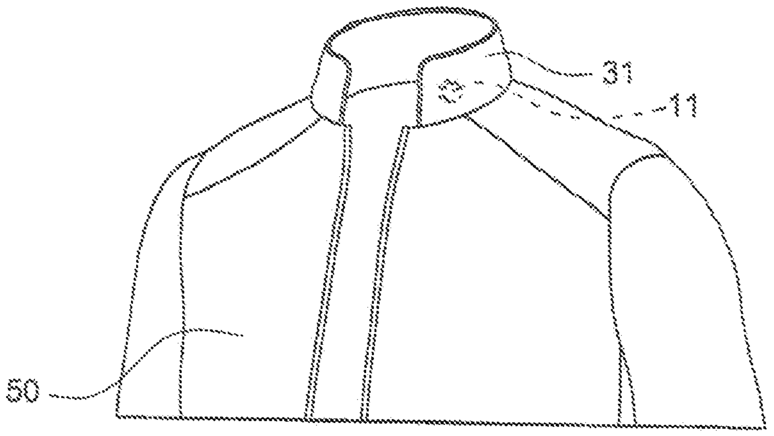
FIG. 8 is a perspective view showing an article of apparel, herein a top portion of a vest and wherein the control device is mounted on a liner fabric hidden behind to the outer shell fabric material of a collar portion of the article of apparel and wherein the switch is made operable by the user person feeling the large switch membrane which can be depressed by the fingers to operate the function which are detected by signals from the haptic hammer device.
Figure 9:
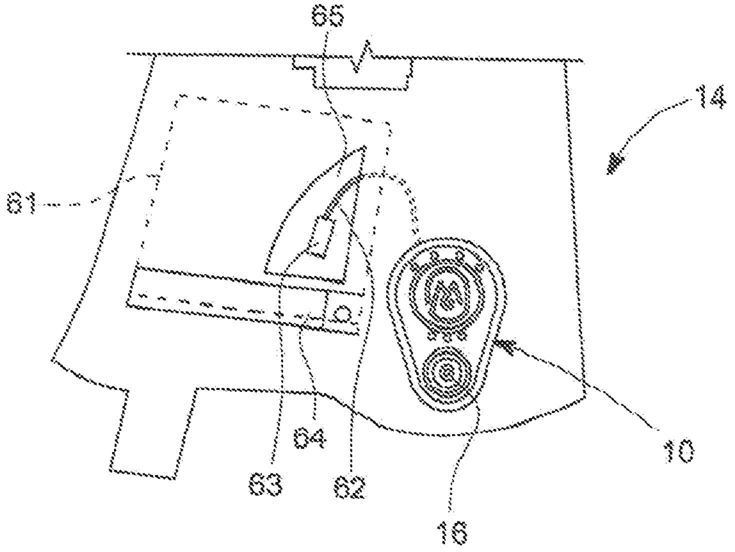
FIG. 9 is a fragmented view of a glove showing the control device mounted in on the outer surface of the glove in close proximity to a battery retention pocket provided with a closure to isolate the battery from the elements.

Referring now to the drawings, and more specifically to FIGS. 1 to 3 there is illustrated various views of the integrated control device 10 of the present invention and which is adapted for securement to various types of articles of apparel, for example a vest 50, as shown in FIG. 8, or a glove 60, as shown in FIG. 9. The control device 10 is compact and waterproof and can be adapted to other articles of apparel, namely jackets, vests, pants, socks or any other article, not necessarily of apparel, that requires controlled electrical heating.

Figure 7A:
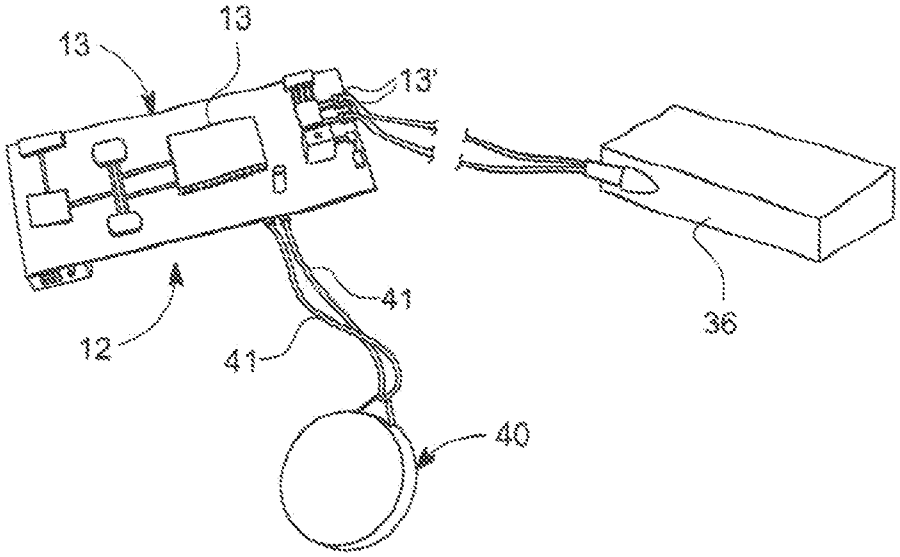
FIG. 7A is a perspective view of the pcb board and showing a remote chargeable battery connected to the pcb board and also showing the wire connection of a haptic hammer device adapted to be located remotely of the control circuit for generating haptic vibration signals to be sensed by a wearer person.

The integrated control device 10 is provided with a finger-operable switch 11 integrated with and connected to input supply wiring 13' of a battery supply 36, as shown in FIG. 7A, mounted on a pcb (printed circuit board) board 12 on which is mounted other electronic circuits 13. The circuits 13 include a communication circuit, not specifically identified herein, but obvious to a person skilled in the art, to interface with a user person to provide message information to the user person. A waterproof envelope 14, as shown more clearly in FIG. 3, shields all of the electronic circuits mounted on the pcb board 12, and associated wiring as well as the finger-operable switch 11. The waterproof envelope 14 is formed by molded silicon material defining entirely the top surface 15' of the control device 10 and the surrounding housing 16' of an input electrical connecting port 16, as well and the undersurface thereof.

Figure 4B:
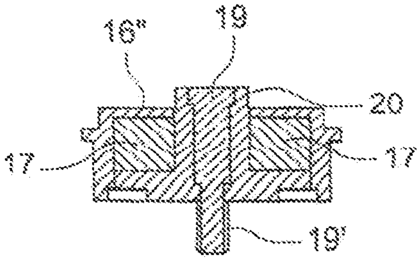
FIG. 4B is a cross-sectional view showing the construction materials and shape of the female electrical magnetic connector.
Figure 4A:
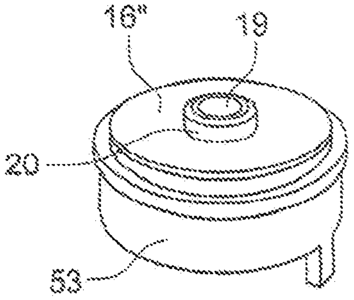
FIG. 4A is a perspective view showing the construction of the female electrical magnetic connector secured at the base of the cylindrical connecting housing of the input connecting port.

Referring additionally to FIGS. 4A to 4B, the input electrical connecting port 16 has a magnet retainer mounted, as will be described in detail below, and accessible from outside the waterproof envelope 14 and adapted to receive a coupling part of an external electrical connector 21 secured to a conductor cable 22 and adapted for magnetic coupling with the magnet retainer mounted inside a concave cylindrical retention housing 16' of the input electrical connector 16 to provide power from an external electrical power source. The concave cylindrical retention housing 16', is provided with a central electrical conductor coupling 19, herein a metal rod, disposed centrally in a magnetically coupling surface 16" located inside the cylindrical retention housing 16', below the open top end 52 and forms a base wall thereof. The metal rod 19 protrudes at its bottom end 19' to provide electrical connection to the pcb 12. The central electrical conductor coupling 19 is electrically insulated from the metal coupling surface 16" by an electrically insulating rubber spacer member 20. As shown in FIG. 4B, a cylindrical ring magnet 17 magnetizes the metal coupling surface 16" in contact therewith.

Figure 5B:
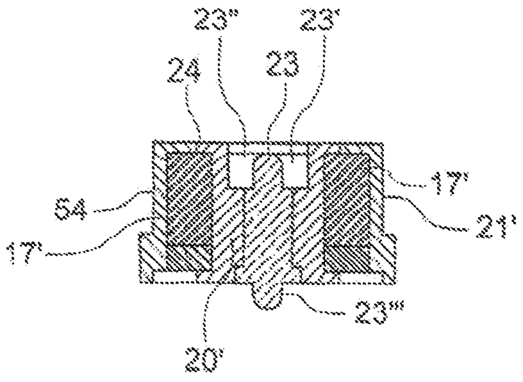
FIG. 5B is a cross-sectional view showing the construction material part and shape of the male electrical magnetic connector.
Figure 5A:
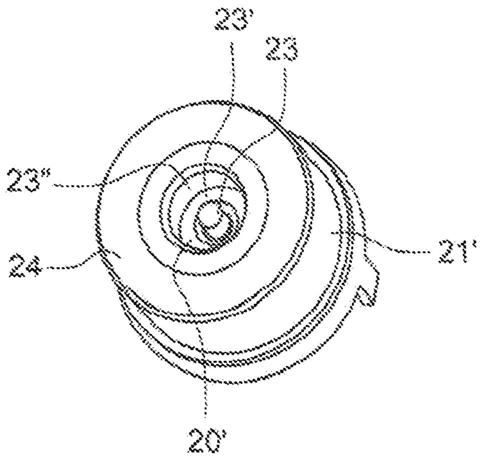
FIG. 5A is a perspective view showing the construction of the male magnetic electrical connector secured in an end connecting plug, such as illustrated in FIG. 6, of a battery supply cable or a charging cable, and configured for insertion and magnetic coupling with the female electrical magnetic connector in the cylindrical connecting housing of the input connecting port.

With additional reference to FIGS. 5A and 5B, the external electrical connector 21 is formed with a projecting cylindrical body portion 21' for close fit in the concave cylindrical housing 16'. A central electrical conductor coupling 23, also in the form of a metal rod having a bottom end section 23'" for electrical connection, is mounted in a bottom wall 23' of a hollow cavity 23" of the cylindrical body portion and surrounded at a top end by an electrically insulating second magnetically attractable flat metal surface 24 for magnetic coupling retention over the first magnetically attractable flat metal surface 16" of the external electrical connector with the conductor coupling 19 in contact with the conductor coupling 23 to establish a conductive path for electrical voltage. As shown in FIG. 5B, a cylindrical ring magnet 17' magnetizes the metal coupling surface 24. The first and second magnetic attractable flat surfaces 16" and 24 exhibit a magnetic coupling force of a predetermined strength permitting rotational planar displacement of the cylindrical body 21' of the external electrical connector 21 in the cylindrical retention housing 16' when a shear force is applied thereto by the application of a pulling force on the conductor cable, as shown by arrow 51 in FIG. 6, without separating the magnetic coupling retention force between said first and second magnetic attractable surfaces 16" and 24. Power is conducted to the pcb board by the coupling of the external electrical connector with the positive terminal being provided by the contact between the rods 19 and 23 and the negative terminal by the coupling surfaces 16" and 24.

As shown in FIGS. 5A and 5B, the circular ring members are formed of stainless steel material and are magnetized by the cylindrical ring magnets disposed there behind in contact therewith to generate a magnetic field which create a predetermined magnetic force, wherein when the circular ring members 16" and 24 are coupled to one another by the interaction of their magnetic field, while permitting rotational planar displacement therebetween. Because the cylindrical retention housing is a hollow housing, its surrounding side wall 42 prevents the body portion 21' of the external connector from disconnection therefrom and retains it for rotational displacement therein.

Figure 6:
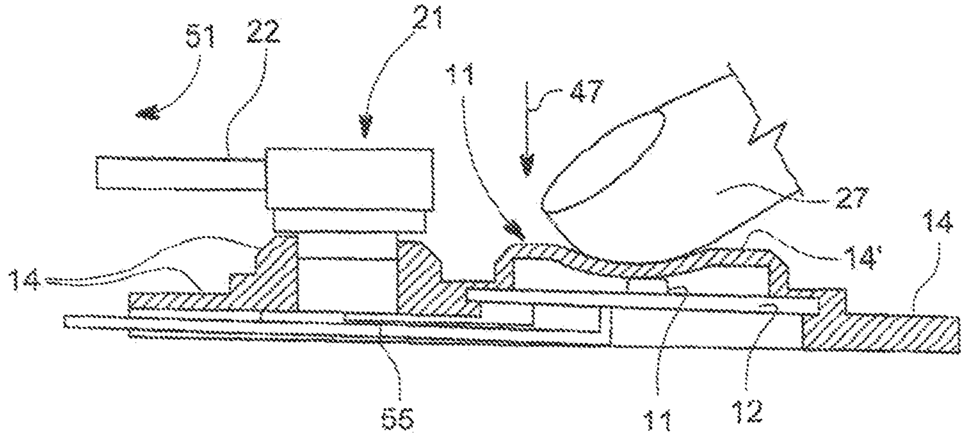
FIG. 6 is a sectional view similar to FIG. 3 but showing male and female connectors engaged and the switch button activating membrane compressed by the finger of a user person to actuate the push-button switch.

The finger-operable push-button switch 11 is secured at a predetermined position on the pcb board 12 which provides a rigid support surface to permit actuation of its push button, as shown in FIG. 6. As shown in FIGS. 3 and 6, the waterproof silicon envelope 14 defines a switch actuating formation 14' which extends entirely over the actuation button 11' and beyond and permits the actuation button 11' of the switch 11 to be depressed by a user person's finger 27, as illustrated in FIG. 6, in the direction of arrow 47 to effect a switch closure. The actuation button 11'automatically returns to its original position by its upward spring biased. The construction of such push-button switches is well known in the art.

As shown in FIG. 2A, the conductor cable 45 is the only wire cable of the control device and it carries all of the power feed wires 26 to the individual heating wires secured to the article of apparel. Accordingly, the control device 10 contains only a single fixed external cable 45 which shields all of the feed wires 26 and it is made of a predetermined length to connect to a distribution terminal or terminals to which one or more heating wire patterns are connected to. Therefore, the assembly in an article of apparel such as a jacket or vest is greatly facilitated and the risk of wiring breakage is substantially reduced in its travel path during the fabrication of the article of apparel. Because the control device is fully integrated, its installation in a garment only necessitates stitching a seam 30 in the external peripheral seam area surrounding the control device waterproof housing.

As shown in FIG. 2A, the control device 10 is integrated into a silicon envelope 14 which is a material capable of being stitched to a fabric material such as a liner material or outer fabric material 29 as herein shown by the stitch seam 30 or simply glued thereon for permanent retention. The silicon envelope 14 is configured to form a peripheral outer stitch seam region 28' specifically adapted to receive stitch seams 30.

As shown in FIG. 8, and due to the integrated construction of the control device, it can be secured at a concealed location behind a collar region of an outer fabric of an article of apparel 50 and against an inner liner, not shown but obvious to a person skilled in the art, with the switch actuation formation 14' facing the inner surface of outer fabric shell 31 of the article of apparel at a predetermined location. The switch actuation formation 14" projects sufficiently from the liner fabric to permit actuation of the push-button switch by a user person's fingers feeling the bump in the outer fabric created by the elevated actuation button 11' and squeezing the bump, herein the switch actuation formation 14" between the fingers. With such an installation the control device 10 is concealed and does not interfere with the aesthetic appearance of the article of apparel.

With reference again to FIG. 2A, there is shown a set of light emitting diodes 35 visible on the top surface 15' of the support base an mounted on the pcb board 12 and arranged with a desired configuration. The light emitting diodes 35 provide a visual indication to a user person of several functions, herein a charge capacity present in a battery 36 connected to the pcb board 12 or a battery pack located remotely in suitable pouches of the article of apparel and connected to input connecting port 16. It also displays the charging cycles when charging the battery connected to the pcb board, cycling from the first LED to the fourth LED, the fourth LED indicating that the battery is fully charged. The light emitting diodes 35 can also display the actual charge remaining in the battery 36 or battery pack associated with the article of apparel whereby the user person is provided information as to the necessity to recharge the battery or battery pack and the amount of time remaining to be comfortable in his article of apparel. The light message information provided by the light emitting diodes 35 may also be constituted by different color light emitting diodes with the color red indicating maximum heat intensity and white the minimum heat intensity provided to the heating wires secured to the article of apparel and green indicating that the battery or battery pack is fully charged. Alternatively, the information may be provided by different flashing rates of one or more of the light emitting diodes or simply by lighting different numbers of the four or more light emitting diodes 35. To power "on" or "of" the control circuit, the switch is held depressed for a predetermined time period, such as five seconds.

As shown in FIGS. 1, 2A and 3 the top surface 42 of the switch actuation formation 14' is herein shown with a transparent logo form 43 which is illuminated by a light emitting white diode or a color diode 35', see FIG. 3, mounted on the pcb board and disposed in the space 45 below the switch actuation formation 14' to provide a visual illuminated logo 43 and indicating that the power is "on" or "off".

Figure 7B:
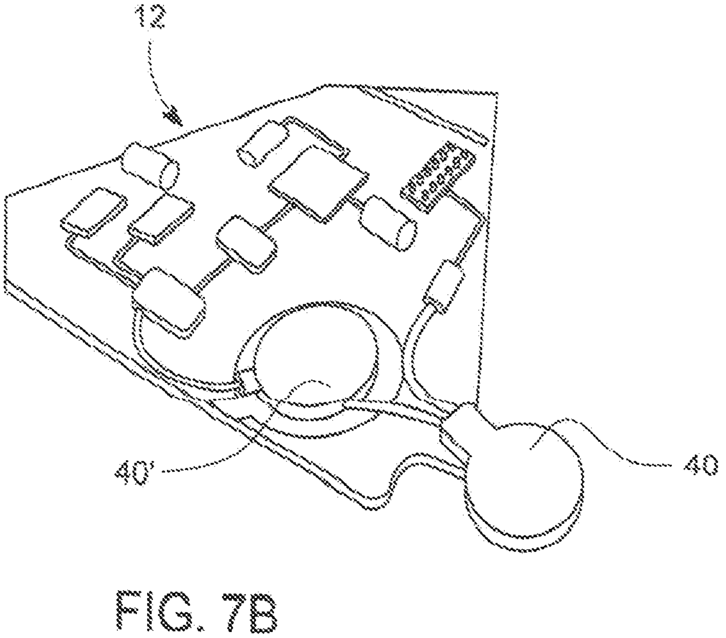
FIG. 7B is another perspective view showing a part of the pcb board illustrating that the haptic hammer device may be mounted directly of the pcb board.

Referring now to FIGS. 7A and 7B, there is illustrated another form of transmitting message information to a user person when the control device 10 is secured behind an outer fabric shell 31, as illustrated in FIG. 8 wherein the control device is not visible to the user person. With such installation, a haptic hammer device 40 is electrically connected by wiring 41 to the pcb board 12 and located in small pouches, not shown, or at any convenient location to generate impulses detectable on a wearer person's skin, or detectable by audible vibrations, to provide signals to the user person of the temperature intensity setting being set by the push-button switch 11. The number of nocks or spacing of the nocks generated by the haptic hammer is correlated to the desired function set by the push button switch. With such an embodiment the spacing sequence of the impulses or nocks generated by the haptic hammer would indicate the intensity setting of the charge remaining in the battery supply. As shown in FIG. 7B, the haptic hammer can be mounted directly on the pcb board 12, as indicated by reference numeral 40'. Also, there may be mounted two haptic hammers working in synchronism one mounted on the pcb board at 40' and another remotely as shown at 40.

As mentioned above, the pcb board also contains a communication circuit, not shown but obvious to a person skilled in the art, and it feeds other light emitting diodes 42, as shown in FIG. 2A, to provide further light information messages to the user person, such as warning signals that the charge capacity present in a battery or battery pack has only a certain remaining time of use and requires recharging or change. The communicating circuit may also provide for remote control of the circuit by a smart phone or other suitable smart devices. Accordingly, the communication circuit has a computer provided with a memory which is programmed to execute certain functions programmed in its memory and which is made accessible to a user person.

With reference to FIG. 9, it is clearly illustrated how the control device of the present invention overcomes all of the disadvantages of prior art heated gloves mentioned herein above. As herein illustrated, the heated glove 60 has the control device 10 mounted in close proximity to the battery holding pocket 61 with a very short input wire 62 extending into the pocket 61 and provided with a connector 63 to plug into a battery 85 placed into the pocket 61 and protected therein by the zipper closure 64. In order to charge the battery 65, all that is necessary is to attach the external electrical connector 21 to the input connecting port 16 without having to remove the battery from the pocket and thereby greatly facilitating the charging operation without having to manipulate the battery 65 and the zipper closure 64. Additionally, if the battery becomes depleted of its charge during use, the wearer person can provide additional power by connecting a connector 21 from a spare battery, that it may be carrying, to the connector 16 of the control device 10. Still further if the battery is not comfortable to the wrist area of the wearer person, it can be removed with the power coming from another battery supply carried in a pocket at another location, for example on the sleeve of an outer wear article of apparel and in close proximity to the glove. Also, such external power source may be greater to extend the heated time of the heated glove.

Briefly, summarizing, the fully integrated control device 10 of the present invention provides a single location for its switch operation, its input port for charging a contained battery or providing an external power source, providing visual or non-visual messages to the user person and protected wiring, all within an insulated housing and wherein the manufacture of the housing and its component parts is economical to manufacture and simple to install while preventing premature problems associated with wiring and breakdown of associated parts.

The use of the wording "integrated control device" as used herein defines a control device wherein the electronics, the control switch, the charging port and the LED's, are all contained in a single waterproof device.

Many modifications and other embodiments of the present invention as described above will come to mind to a person skilled in the art to which the invention pertains having the benefit of the teachings described herein above and the drawings. Hence, it is to be understood that the embodiments of the present invention are not to be limited to the specific examples thereof as described herein and other embodiments are intended to be included within the scope of the present invention and the appended claims. Although the foregoing descriptions and associated drawings describe example embodiments in the context of certain examples of the elements and members and/or functions, it should be understood that different combinations of elements or substitutes and/or functions may be provided by different embodiments without departing from the scope of the present invention as defined by the appended claims. Furthermore, although specific terms are employed herein, they are used in a generic and descriptive sense only and other equivalent terms are contemplated herein with respect to the items that they relate to. It is therefore within the ambit of the resent invention to encompass all obvious modifications of the examples of the preferred embodiment described herein provide such modifications fall within the scope of the appended claims.

The invention claimed is:

1. An integrated hand-operable compact control device for mounting in electrically heated articles of apparel for controlling power to heating wires secured in said articles of apparel, said control device having a finger-operable switch integrated with electronic circuits mounted on a pcb board, said electronic circuits having a communication circuit to interface with a user person to provide message information to said user person a waterproof envelope shields at least a portion of said control device, an input electrical connecting port mounted side-by-side with said finger-operable switch and accessible from outside said waterproof envelope, said input electrical connecting port being configured to magnetically receive and retain an external electrical connector having a conductor cable secured thereto to provide power to said electronic circuits from an external electrical power source, said input electrical connecting port having a magnetically coupling retainer secured in a base wall of a concave cylindrical housing for surrounding an electrical conductor coupling and electrically insulated therewith, a magnet retainer secured to said external electrical connector for magnetic coupling with said magnetically coupling retainer in said concave cylindrical housing of said input electrical connector, said external electrical connector having a cylindrical body for close rotational fit in said concave cylindrical housing of said input electrical connecting port, a central electrical conductor coupling in a flat top face of said cylindrical body surrounded by an electrically shielded magnetically attractable flat metal surface for magnetic coupling retention over said magnetically coupling retainer of said input electrical connecting port with said central electrical conductor coupling conductively engaged with said electrical conductor coupling of said input electrical connecting port; said input electrical connecting port and said external connector positioned therein, exhibiting a magnetic coupling force of a predetermined strength permitting rotational planar displacement of said external electrical connector and a resistance to shear forces applied thereto by said conductor cable of said external electrical connector, without separating the magnetic coupling retention force between said input connecting port and said external electrical connector.

2. The integrated control device as claimed in claim 1 wherein said base wall of said concave cylindrical housing and said electrically shielded magnetically attractable flat metal surface of said external electrical connector are constituted by flat metal circular ring members formed of magnetic attractable metallic material, said circular ring members defining a central opening in which there is mounted said central conductor coupling of said input electrical connecting port and said external electrical connector, respectively; and an electrically insulating material in said central opening to electrically shield said electrical connector coupling and said central conductor coupling from said circular ring members.

3. The integrated control device as claimed in claim 2 wherein said central electrical conductor coupling of said input electrical connecting port is formed by a central conductive metal post projecting above said base wall of said concave cylindrical housing and spaced a predetermined distance below an open top end of said concave cylindrical retention housing, said circular ring member of said input connecting port constituting said base wall.

4. The integrated control device as claimed in claim 3 wherein said conductor coupling of said cylindrical body of said external electrical connector is located in a cylindrical cavity formed in said flat top face of said cylindrical body and positioned for contact with said central conductive metal post of said input electrical connecting port, said circular ring member of said external electrical connector constituting said flat top face.

5. The integrated control device as claimed in claim 2 wherein said circular ring members are formed by top faces of encapsulating housings which are formed to define outer cylindrical side walls of said input electrical connecting port and said external electrical connector, and a cylindrical magnet disposed between said outer cylindrical side walls and said top faces of said concave cylindrical housing, said concave cylindrical housing being electrically shielded from said central conductive metal post of said input electrical connecting port and said conductor coupling of said external electrical connector by a non-electrically conductive insulating material.

6. The integrated control device as claimed in claim 5 wherein said circular ring members are formed of stainless steel material which is magnetized by said cylindrical magnets to generate a magnetic field which create said predetermined magnetic force, wherein when said circular ring members are coupled to one another by the interaction of their magnetic field, permits said rotational planar displacement of said second circular ring member over said first circular ring member.

7. The integrated control device as claimed in claim 1 wherein said finger-operable switch is a push-button switch secured to said pcb board and extends over a surface of said pcb board, said waterproof envelope being formed by a flexible material shaped to define an elevated flexible switch actuating formation in a top wall thereof which permits said push-button switch to be actuated when said flexible switch actuating formation is depressed by a user person's finger pushing down on said switch actuation formation.

8. The integrated control device as claimed in claim 7 wherein said flexible material is a silicon material.

9. The integrated control device as claimed in claim 7 wherein a conductor cable, having wiring to connect to one or more heating wires, is secured to a supply circuit controlled by said push-button switch and which constitutes a single fixed external wiring connection to said control device to reduce the risk of wiring breakage and facilitating the installation of said control device in said articles of apparel and the connection to said one or more heating wires associated with said articles of apparel.

10. The integrated control device as claimed in claim 7 wherein said control device is mounted on an inner liner of an electrically heated article of apparel, said elevated switch actuating formation projects sufficiently over said pcb board to permit actuation of said push-button switch by a user person's fingers feeling said switch actuating formation disposed behind an outer fabric shell of said article of apparel and with said control device not interfering with the aesthetic appearance of said article of apparel.

11. The integrated control device as claimed in claim 10 wherein a haptic hammer device is electrically connected to said pcb board and attached to said liner at a position to generate impulses detectable on a wearer person's body and/or made audible to said wearer person to provide signals to said wearer person of the temperature intensity setting being set by said push-button switch, the spacing sequence or grouping of said impulses indicating the intensity setting.

12. The integrated control device as claimed in claim 11 wherein said light message information is provided by different flashing rates of one or more of said light emitting diodes.

13. The integrated control device as claimed in claim 12 wherein said one of said light emitting diodes is mounted behind an elevated flexible switch actuating formation formed in a top wall of said switch actuating formation to illuminate a transparent logo in said top wall.

14. The integrated control device as claimed in claim 1 wherein said waterproof envelope completely surrounds said control device and formed of a silicon material shaped to define an elevated flexible switch actuating formation in a top surface thereof, said input electrical connecting port being mounted in said top surface, and a peripheral outer stitch seam region defined about said waterproof envelope adapted to receive connecting stitches for securement to an article of apparel.

15. The integrated control device as claimed in claim 1 wherein there is further provided a set of light emitting diodes mounted on said pcb board and made visible in a top surface of said waterproof envelope; said light emitting diodes providing a visual indication to a user person of one of a charge capacity present in a battery or battery pack connected to said input connecting port, a visual charging process when charging said battery or battery pack, and the temperature settings of heating wires associated with said articles of apparel.

16. The integrated control device as claimed in claim 1 wherein said communication circuit comprises light emitting diodes to provide light message information to said user person, said light message information comprising of one of a charge capacity present in a battery or battery pack connected to said input connecting port when charging said battery or battery pack, the charging process of a battery or battery pack, and the temperature settings of heating wires associated with said articles of apparel.

17. The integrated control device as claimed in claim 16 wherein said light message information is provided by different color light emitting diodes with the color red indicating maximum heat intensity provided to said heating wires secured to said articles of apparel or by having a certain number of light emitting diodes lit from a group of light emitting diodes.

18. The integrated control device as claimed in claim 1 wherein said communication circuit has a computer provided with a memory which is programmed to execute functions to provide signals to a wearer person, said signals constituting one of a visual local signals provided by light emitting diodes or impulse signals provided by one or more haptic hammers connected to said electronic circuits.

19. The integrated control device as claimed in claim 1 wherein said electrically heated articles of apparel are one of jackets, pants, gloves, socks or other such heated articles of apparel.

* * * * *